United States Patent [19]

Kahkipuro

[11] 4,414,619
[45] Nov. 8, 1983

[54] PROCEDURE AND APPARATUS FOR SWITCHING THYRISTOR BRIDGES IN STATIC ALTERNATING CURRENT/DIRECT CONVERSION

[75] Inventor: Matti Kahkipuro, Hyvinkää, Finland

[73] Assignee: Elevator GmbH, Baar, Switzerland

[21] Appl. No.: 218,766

[22] Filed: Dec. 22, 1980

[30] Foreign Application Priority Data

Dec. 28, 1979 [FI] Finland ............................. 794075

[51] Int. Cl.³ .......................................... H02M 7/17
[52] U.S. Cl. ..................... 363/70; 363/160; 318/762
[58] Field of Search ................ 318/762, 763, 293; 363/159, 160, 161, 162, 70

[56] References Cited

U.S. PATENT DOCUMENTS

| | | | |
|---|---|---|---|
| 3,320,514 | 5/1967 | Lawrence | 363/162 |
| 3,588,668 | 6/1971 | Cova | 363/162 |
| 3,713,012 | 1/1973 | Johnson | 363/70 |
| 4,056,767 | 11/1977 | Tobise et al. | 363/63 X |

*Primary Examiner*—William M. Shoop
*Attorney, Agent, or Firm*—Martin Smolowitz

[57] ABSTRACT

A method and apparatus for switching thyristor bridges in converting alternating current statically to direct current by the aid of two thyristor bridges connected in parallel so that a direct current machine consuming direct current will receive both positive and negative current. One and the same analog voltage controls both thyristor bridges so that when the controlling analog voltage is positive the first bridge is open and when the controlling analog voltage is negative the second bridge is open, and that as the circuit approaches zero-current state the bridges shift to a reciprocally oscillating mode of operation.

3 Claims, 7 Drawing Figures

PROCEDURE AND APPARATUS FOR SWITCHING THYRISTOR BRIDGES IN STATIC ALTERNATING CURRENT/DIRECT CONVERSION

The present invention is directed to a procedure for switching thyristor bridges when converting alternating current to direct current by static means with the aid of two parallel-connected thyristor bridges so that the machine using direct current obtains both positive and negative current.

Ever more frequently nowadays, in the course of development of semiconductor technology, rotary rectifiers and current converters are replaced with static components, such as converters constructed with the aid of thyristors. This new design technology has introduced certain drawbacks, the correction of which has been tried with varying success. One such drawback is the pause period during which the entire system is in zero-current state. The pause period intervenes when a positive current turns to become negative, and vice versa. In this connection then the thyristor bridge is switched for another. The following harmful effects, among others, follow from the pause there is no control of the system; the there is direct impairment of operation; and in elevator drive application, for instance, it gives rise to objectionable vibrations. Moreover, specifically in elevator operations the pause causes poor starting which is experienced by the persons in the elevator car, as an unpleasant jerk. These detriments are highly inconvenient especially in direct current elevator drives, which are expensive and therefore command a high requirement level.

B. R. Pelly, in his book "Thyristor Phase-Controlled Converters and Cycloconverters. Operation, Control and Performance", describes extensively the static converters and the problems met in them. On pages 114–126, the system without circulating current is discussed, of which type is also the system in this new invention. Likewise, on said pages the origin of the pause and its detriments when shifting operation from one thyristor bridge to another are thoroughly considered.

The apparatus disclosed in the U.S Pat. No. 3,713,012 has reference exactly to thyristor bridge switching and to the drawbacks occurring therein. In this apparatus, the zero current pause period could be substantially curtailed by means of a circuit which strongly reduces the burning angle of the thyristors down to a predetermined minimun limit, then switches thyristor bridges in this state, deflects the error signal so that this might cause the burning angle to rapidly increases away from the minimum limit, and terminates the deflecting when the thyristor bridge starting its operation is ready to supply current. The drawback of this apparatus is the error signal amplifier part, the operation of which can never be completely free of delay. Therefore, a harmful pause is incurred in the zero-current condition, and its elimination has not been possible.

It is thus understood that in both above-mentioned examples the aim is to minimize the pause created at the reversing phase. But it is typical of both that at the reversing phase there occurs a pause of a certain length. The length of the pause is usually a few mains cycles, and the mains cycle is in the systems described, with 50 Hz, 3.3 milliseconds.

SUMMARY OF INVENTION

The object of the present invention is to eliminate the drawbacks mentioned and to provide a positive and reliable operation of the thyristor bridge switching function.

The method of the invention is characterized in that one analog voltage controls both thyristor bridges, so that when the controlling analog voltage is positive, the first bridge is open and when the controlling analog voltage is negative, the second bridge is open, so that when the circuit approaches zero-current condition, the bridges shift to an inter-oscillating mode of operation. The advantage of the procedure of the invention is that the commutation phase is pauseless, that is, the second thyristor bridge opens immediately at the first possible moment, which is 3.3 ms after the preceding current pulse. Therefore the drawbacks mentioned cannot present themselves.

One favourable embodiment of the invention is characterized in that the analog voltage controlling the thyristor bridges has two minimum limits which are alternatingly in force, depending on the sign of the controlling analog voltage, and that the minimum limits are removed when the current disappears. The advantage is then that one is able to eliminate the risk of short-circuit which would otherwise threaten the system at the bridge-switching moment because the bridges would be switched at the exact moment when current is supplied into the circuit. Thanks to the minimum limit circuit, the final switching of bridges takes place exactly at the moment when the current pulse ends.

The invention also is directed to an apparatus for carrying out the procedure mentioned. The apparatus comprises especially two thyristor bridges, a current measuring arrangement, a motor operating as load, a thyristor igniter unit and a current controller. The apparatus of the invention is characterized in that the current controller consists of a summing amplifier of which the output signal controls the igniter unit, and of a current datum switch, a voltage limiter switch and voltage limiters connected thereto. The output signal of the summing amplifier controls both the igniter unit and the memory circuit switch, the voltage limiting switch and also the voltage limiters. The input signal of this summing amplifier consists both of the signal from the voltage limiters arriving through the current datum switch and the voltage limiting switch and the signal arriving from the controller-amplifier proper, and also the signal derived from the comparator output signal. The comparator receives for its control, the current set-point value and the output signal of the memory, this memory being controlled through the memory circuit switch in the manner determined by the current indicator signal from the output signal of the summing amplifier. The advantage is then that delay-free switching of thyristors has been accomplished.

The invention is described in greater detail in the following with the aid of an example, with reference being made to the attached drawings, wherein:

DESCRIPTION OF THE INVENTION

Figure 1:
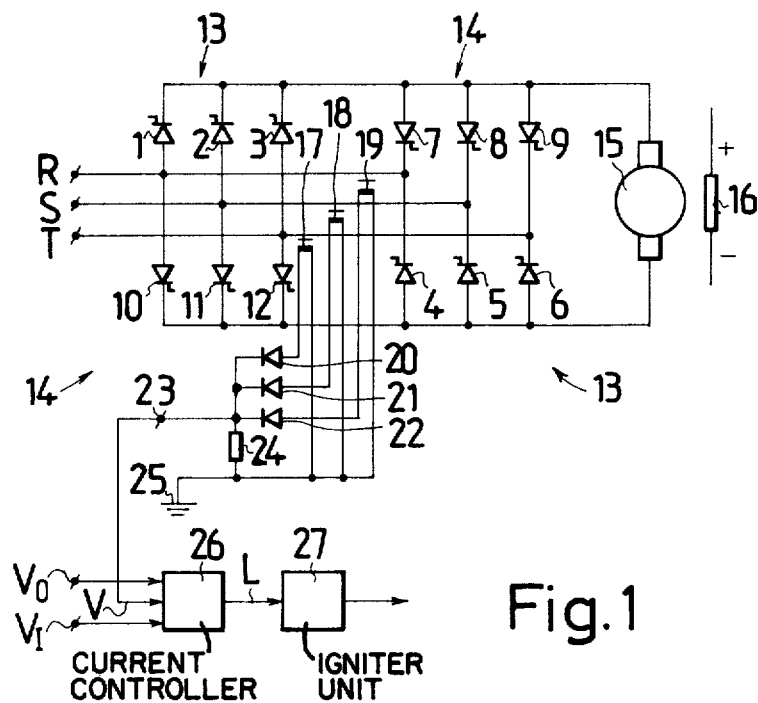
FIG. 1 shows the essential features of the power section of the static converter.

FIG. 1 illustrates the substantial features of the power section of the static converter, and the current controller (26) and igniter unit (27) associated with the power section. The power section is comprised of two thyristor bridges, the first thyristor bridge (13) comprising the thyristors (1-6) and the second thyristor bridge (14) comprising the thyristors (7-12). Furthermore, the power section comprises a current measuring unit comprised of sensing transformers (17-19), diodes (20-22) and the resistor (24). The current datum is received through the terminal (23) and the terminal (25) is grounded. Still further the power section comprises the direct current motor (15) and its magnetizing winding (16). The current controller (26) and the igniter unit (27) have been presented as block diagrams in FIG. 1 for the sake of clarity.

Figure 2:
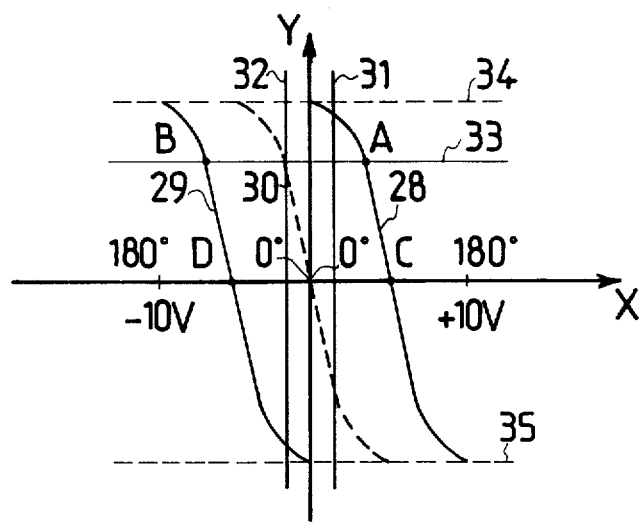
FIG. 2 shows the characteristic curves of the igniter belonging to the apparatus.

FIG. 2 displays characteristc curves of the igniter unit (27). The general principle involved has the thyristor bridge (13) operating at positive voltages and the thyristor bridge (14) operating at negative voltages. The igniter unit (27) is angle-linear, so that zero volt input voltage corresponds to 0° burning angle of the thyristor bridge (13) and +10 volts input voltage corresponds to 180° burning angle of the same thyristor bridge. In analogy, 0 volts corresponds to 0° burning angle of thyristor bridge (14) and −10 volts corresponds to 180° burning angle of the same bridge. The x axis represents the input voltage and corresponds to the signal (L) shown in FIG. 1. This signal is the normal output voltage signal of the operator amplifier, which may vary within ±10 volts. The y axis indicates the output voltage of the thyristor bridges, which as shown in FIG. 1, is supplied to the terminals of the motor (15). The curve (28) indicates the voltage of the thyristor bridge (13) and, by analogy, curve (29) indicates the voltage of thyristor bridge (14). The dotted line curve (30) indicates the output voltage of the controller amplifier (SV). The voltage (34) is the highest possible positive voltage supplied by the thyristor bridges and the voltage (35) is the equivalent highest negative voltage. The input voltage (31) is the lowest permissible control voltage at which the thyristor bridge (13) operates without trouble when conducting. The input voltage (31) is also called the positive minimum limit. The input voltage (32) is the equivalent lowest permissible voltage absolute value for the thyristor bridge (14). The input voltage (32) is also called the negative minimum limit. These minimum limits of the control voltage are commonly known restrictions on such thyristor drives.

Figure 3:
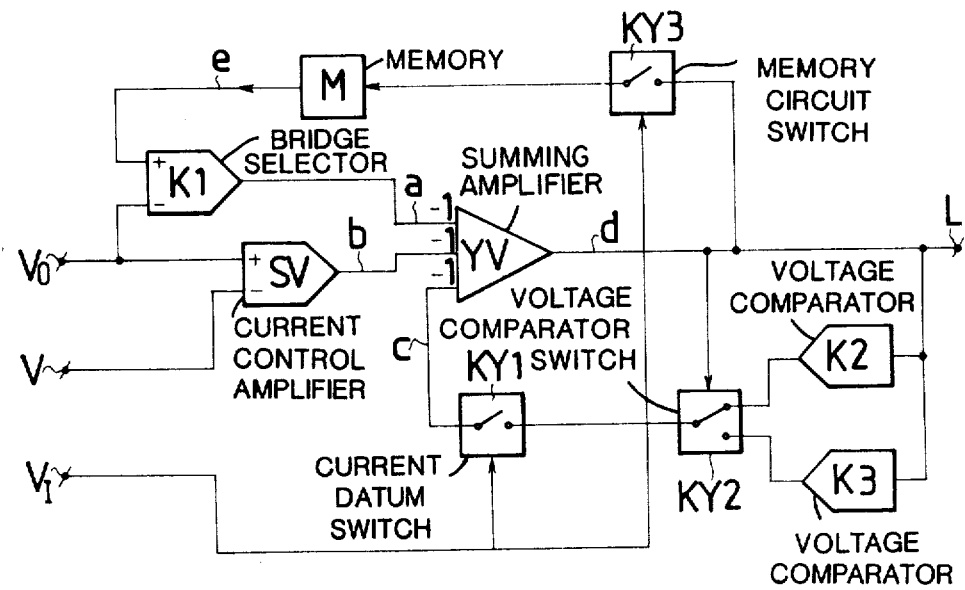
FIG. 3 shows, in the form of a block diagram, the current controller of the apparatus, FIG. 4 schematically shows the circuit diagram of the current controller, FIG. 5 displays the output voltages, in a given operational state, at various points in the circuit in question.

FIG. 3 shows in block form what is in more detail described in FIG. 4 below, relating to current controller 26.

Figure 4:
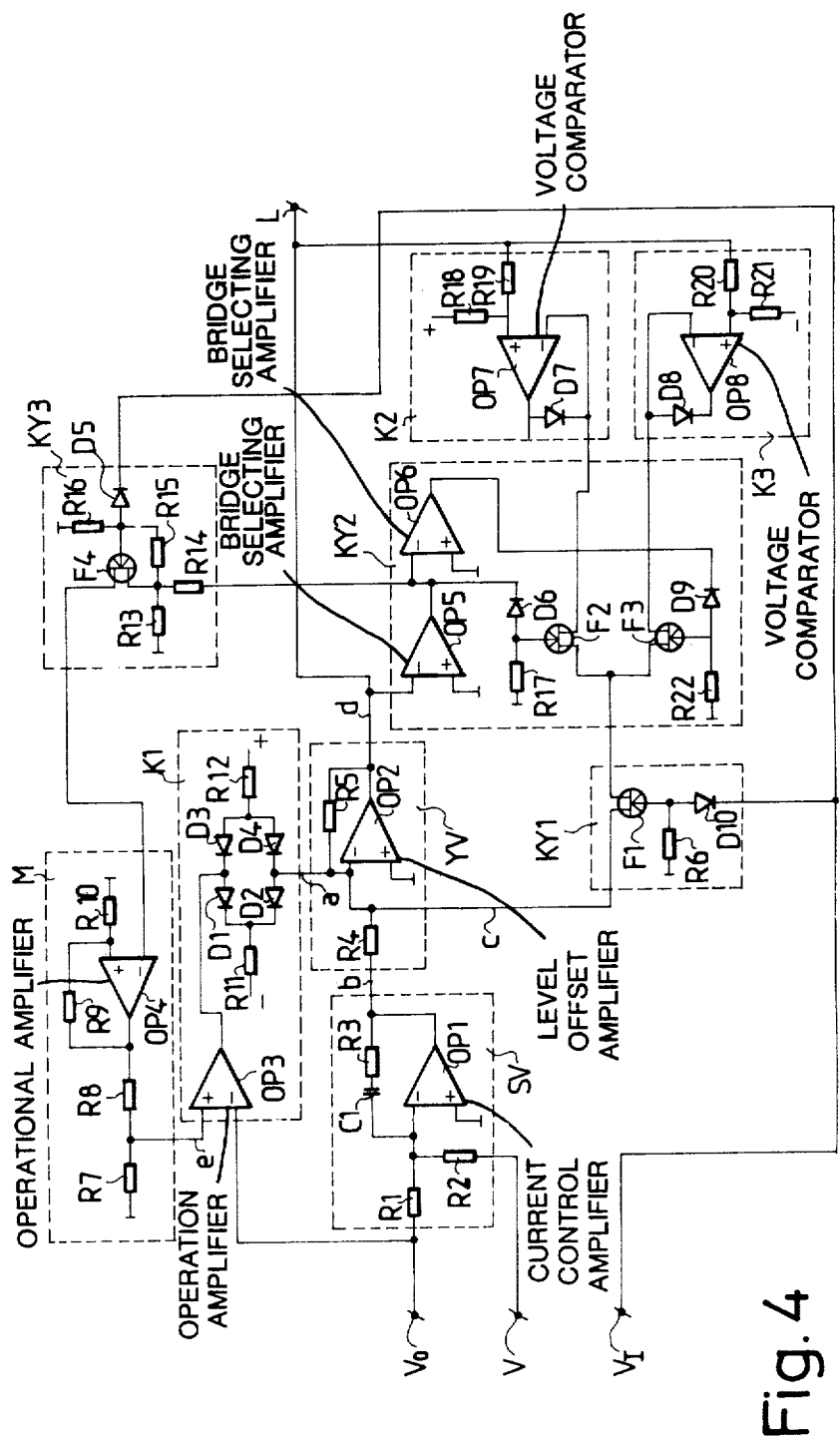

FIG. 4 is the circuit diagram of the current controller (26) in its most essential parts. The current controller amplifier (OP1) receives the reference current/set-point ($V_o$) and the current/actual value datum (V). The current/actual value datum (V) is processed by commonly known apparatus and methods, in that the current datum is polarized because the current measurement data are always positive. This is also evident in FIG. 1, where the current is formed with the aid of diodes (20-22) so that the current datum lies across the resistor (24). The current/actual value (V) arriving at the controller amplifier (26) is always positive since through the diode, a voltage of the same direction is always present. The current/actual value datum (V) comes to the current controller (26) through a commonly known polarizer amplifier (not depicted), which has the task to convert this same voltage into a positive or negative voltage depending on which thyristor bridge has been selected. The third datum arriving at the current controller is the so-called current indicator datum ($V_I$) which in practice is formed of the current/actual value (V). The forming of the current indicator ($V_I$) is accomplished in a commonly known manner and is therefore not presented here.

Three phase A.C. is applied to points R, S, and T per FIG. 1, to inputs of thyristor bridges 13 (thyristors 1-6) and 14 (thyristors 7-12). Current sensing transformers (17-19) are connected across the three A.C. phases. The output of the transformers (17-19) is fed into diodes (20-22) and termed across resistor 24. The rectified voltage is always positive and is directed to the V input of the current controller 26 through terminal 23.

The output voltage L responds as follows: if the voltage is at +10 volts, the thyristor bridge 13 will ignite; when the voltage is at −10 volts, the thyristor bridge 14 will ignite; when the voltage approaches zero, the thyristor bridges have no output current. The igniter unit 27 operates in a conventional mode with igniter circuit outputs firing at proper time sequence in response to switching pulses (±10 volts at 3.3 ms).

Input $V_o$ to current controller 26 will set the operating limits of the control circuit, i.e., opening and closing the bridge. $V_I$ input can be used for remote control switching of the thyristor bridges. Outputs of the two thyristor bridges 13 and 14, are applied to the direct current.

It is possible with the aid of the level offset amplifier (OP2) to offset the output voltage of the current controller amplifier plus or minus 5 volts. By this offset, one moves e.g. from point A on the curve in FIG. 2 to point B, that is, one achieves exactly the requisite 10-volt jump. The jump from A to B takes place when the speed of rotation of the motor (15) is represented by the voltage (33). When the speed is zero, the corresponding jump is from point C to point D. It depends on the different speed situations, on which level the jump will occur. The level offset with the aid of OP2 is effected in commonly known manner, utilizing operator amplifiers. The level offset is controlled by the operator amplifier (OP3); the other function of this amplifier shall be described later on.

The bridge selecting amplifiers (OP5) and (OP6), again, operate so that when the output voltage of OP2 is positive, OP5 has a negative output voltage and OP6 a positive output voltage. Since OP5 and OP6 both are comparator circuits, they always go up to their saturation value about ±12 volts. Thus, OP5 and OP6 follow as bridge selecting amplifiers the output voltage of OP2. OP7 and OP8 voltage comparators constitute the minimum limits of the control voltage, their magnitude being determined by the resistors R18, R19, R20 and R21. The minimum voltage limits correspond, typically, to 30° burning angle, and these limits are needed in order that the system might operate properly, because according to the general theory of thyristors, the burning angle must not fall below 30°. On the other hand, the minimum voltage limits (31,32) operate here as thyristor bridge switching-inhibiting circuit as long as there is a current in the circuit. The fets (F2) and (F3) are used to select which minimum limit shall be enforced, and this in its turn is fixed on the basis of OP5 and OP6, depending on which bridge has been switched on. For instance, if the output voltage of OP5 is positive, then through the diode (D6) the grid of fet (F2) is at zero potential through the resistor (R17). Hence follows that the fet (F2) is conductive. In the same state, the output voltage of OP6 is negative and, in analogy, the grid of fet (F3) is at −12 volts through the diode (D9). In this state, the fet (F3) is non-conductive. Therefore, the negative minimum voltage limit (32) has been selected, which represents the thyristor bridge (14), which is only open at a negative output voltage (38). The fet (F1) in its turn cancels or keeps in force this minimum voltage limit, accordingly as there is or is not any current. When current is present and thus the current indicator datum ($V_I$) also is positive, the fet (F1) keeps the minimum voltage limit in force, but when the current pulse ends and $V_I$ turns negative, F1 immediately cancels the minimum voltage limit and switching of the thyristor bridges can proceed without pause.

The task of OP3 is to switch thyristor bridges as directed by the signal (e) when the current/set-point value ($V_o$) is small. The whole system will then operate in the so-called oscillating mode, which is in fact the design solution of the present invention regarding bridge switching, or current commutation. The system has another operating mode which is in force when commutation of the current is not topical. In that case, the absolute value of $V_o$ is higher than the output voltage (e) of the memory (M), and therefore $V_o$ alone determines the switching of thyristor bridges. This second mode of operation is in force the greater part of the time, and it is not critical regarding good operation of the system as is the current commutation function. In this second mode of operation, all running is with one thyristor bridge only, and this occurs when the current/set-point value ($V_o$) is high enough, that is far enough removed from the zero-current state. When operating on the positive side, thyristor bridge (13) is switched on until the operating point approaches the zero-current state, and ultimately at a given value of $V_0$ the system changes to the oscillating mode, in which both thyristor bridges alternate in step with the mains frequency. When moving away from the zero state in the negative direction and as soon as a given $V_o$ value is surpassed, the system again returns to its normal mode of operation so that now only the thyristor bridge (14) remains on. The same is also repeated in the opposite direction. Exactly OP3 and OP4 are provided to form the continuous switching, oscillating mode. As mentioned at the beginning of the paragraph, OP3 makes the decision concerning switching, on the strength of the magnitude of the current/set-point value ($V_o$). The resistors (R7) and (R8) determine that voltage on the plus pin of OP3 at current set-points lower than which continuous thyristor bridge switching will ensue. OP4 is an operational amplifier and serves as memory in the thyristor bridge switching operation so that, as the system asks for a new bridge to be switched on, OP4 remembers which bridge was last requested and will not change state until the current indicator ($V_I$) supplies information of the existence of current. It is hereby ensured that the bridge switching will be successful. The fact that OP4 does not change state earlier is due to the fet (F4), which is non-conductive when there is no current. Only when a current is present will the fet (F4) open over the diode (D5), and hereby is it possible to conclude from OP5 which bridge has been switched on, and through the fet (F4) the memory (OP4) changes state and asks for a new thyristor bridge.

Figure 5:
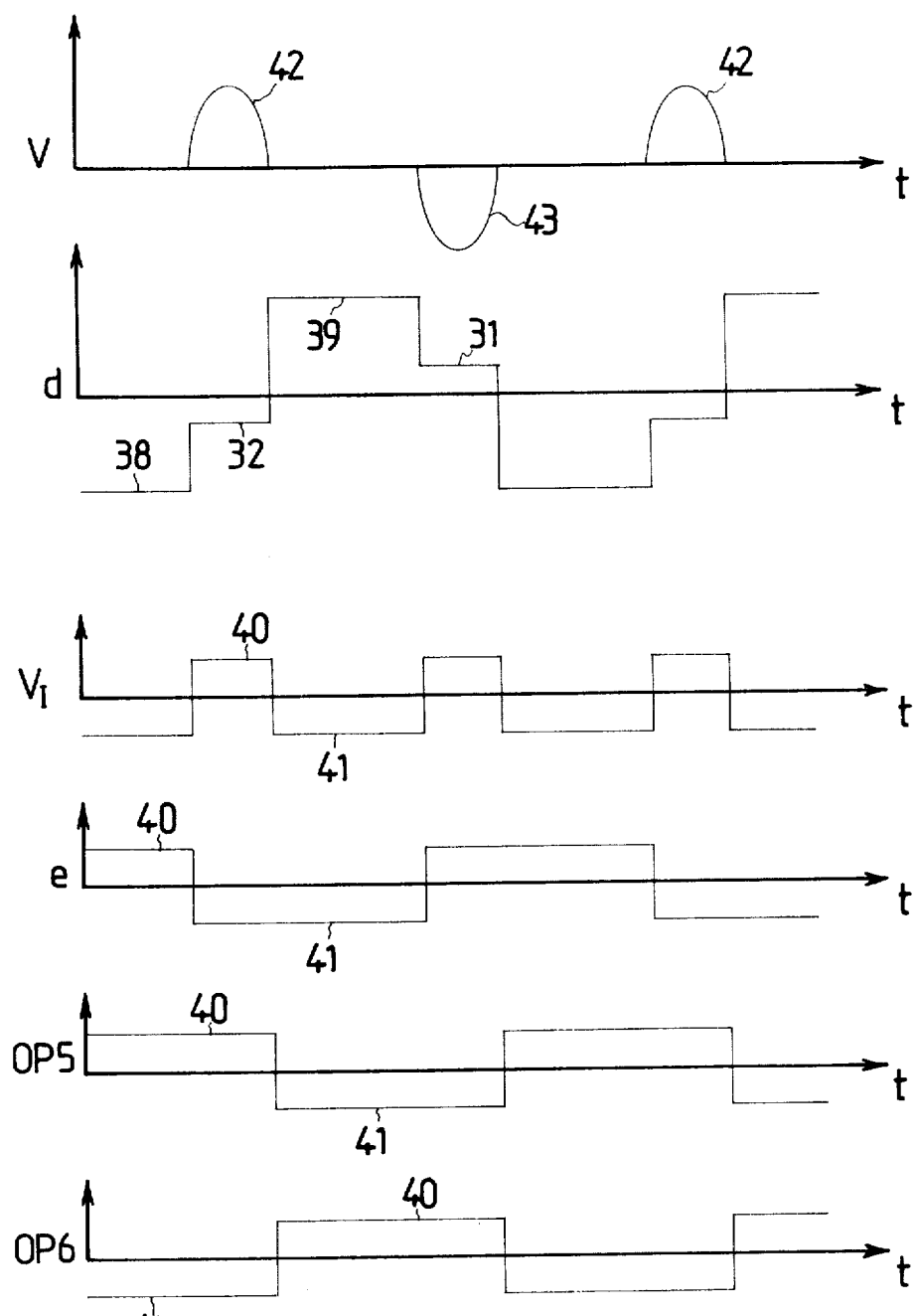

The set of graphs in FIG. 5, reveal the output voltages of the circuit at various points, when the circuit is in a given state of operation. The topmost graph (V) represents the current datum. This illustrates, as a function of time, the current pulses with sign. Between the current pulses there is a pause so that the current pulse and pause together total 3.3 ms. The second graph (d) shows the output voltage (d) of the summing amplifier (YV) per FIG. 3, and which is the same as the output voltage of the whole current controller (26). In the presence of current, for instance when a positive current pulse (42) is ignited, and the oscillating mode is in operation, the voltage (d), which is then at voltage level (38), starts to switch the other bridge on, that is, (d) tends towards a positive voltage. But (d) remains at its negative minimum voltage limit (32), which has the value −1.5 volts. The minimum limit (32) is in force as long as is the duration of the current pulse (42). When the current pulse (42) becomes zero and therefore the current indicator datum ($V_I$) changes from level (40) to level (41), then the minimum voltage limit (32) is removed and the whole 10-volt shift takes place up to its end to the voltage level (39) representing +5 volts. As the current pulse (42) was ignited, the memory (M) simultaneously changed state so that its output voltage (e) shifted from level (40) to level (41). The memory (M) remans at this state until the next current pulse (43) is ignited. When the new current pulse (43) is again ignited after 3.3 ms, the output voltage (d) jumps from level (39) towards the negative level. In this instance, (d) remains at its positive minimum limit (31) for the duration of the current pulse (43). The positive minimum voltage limit (31) is +1.5 volts. When the current pulse is once again zero, (d) will jump to the voltage level (38), which is −5 volts. The minimum voltage limits are important because they prevent the short circuit condition at the moment of bridge exchange. If the voltage (d) were to jump straight from +5 to −5 volts, that is from level (39) to level (38), this would result in a current short-circuit. The graphs OP5 and OP6 represent the output voltages of the respective bridge selecting amplifiers in the different situations. All these graphs reveal the mutual timing in the operation of these components of the apparatus.

Figure 6:
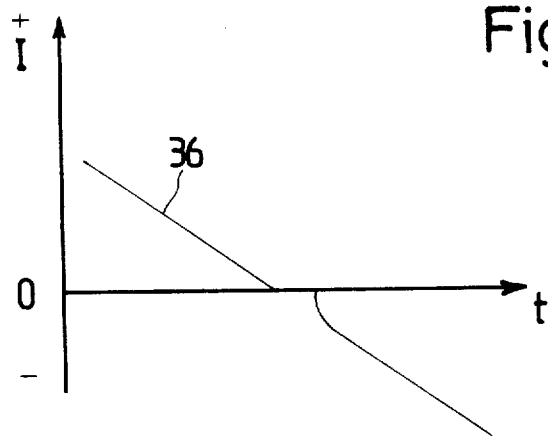
FIG. 6 illustrates, as a function of time, the current signal of the apparatus according to the U.S. Pat. No. 3,713,012.
Figure 7:
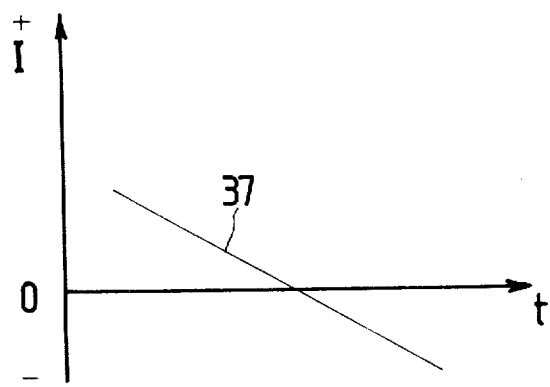
FIG. 7 shows, as a function of time, the current signal of the apparatus of the invention.

The current graph of a commutation system of prior art, shown in FIG. 6, reveals a distinct gap when the current is zero. Moreover, there is a long "catch-up" phase after the pause, by which one endeavours to regain continuity with the original graph. The current graph in FIG. 7 of the commutation system of the present invention presents neither harmful factor. It should be noted, that these curves are a kind of average and they are composed of current pulses progressing in ascending or descending rhythm.

At the transition from oscillating to normal mode of operation, the oscilliating state at first becomes asymmetric, for instance the positive current pulses being larger than the negative ones. After this ensues the normal state.

It is obvious to a person skilled in the art that the invention is not exclusively confined to the example presented above, and that different embodiments of the invention may vary within the scope of the claims presented below.

I claim:

1. An improved method for switching thyristor bridges in converting alternating current statically to direct current, employing two thyristor bridges connected in parallel, whereby direct current motor means will receive both positive and negative current, comprising the steps of: applying a three phase A.C. input to said thyristor bridges and through to current sensing transformers in circuit relationship to said two thyristor bridges: feeding current sensing voltage as an input into a current controllers; directing an output voltage of said controller to an igniter unit for igniting in proper sequence respective thyristors of said bridges, each of said bridges is controlled by the same analog voltage; causing said first bridge to open in the presence of a positive controlling analog voltage; causing said second bridge to open in the presence of a negative controlling analog voltage; and shifting the bridges to a reciprocally oscillating mode of operation as the circuit approaches zero-current state; and feeding output D.C. voltages of said bridges to said motor means connected to said bridges as a load.

2. An improved method for switching thyristor bridges in converting alternating current statically to direct current, employing two thyristor bridges connected in parallel, whereby direct current motor means will receive both positive and negative current, comprisng the steps of: applying a three phase A.C. input to said thyristor bridges and through to current sensing transformers in circuit relationship to said two thyristor bridges: feeding current sensing voltage as an input into a current controllers; directing an output voltage of said controller to an igniter unit for igniting in proper sequence respective thyristors of said bridges, controlling each of said thyristor bridges by providing analog voltage with two minimum limits, said limits being alternatingly in force in response to the sign of the controlling analog voltage; and removing said minimum limits in the absence of said current, causing said first bridge to open in the presence of a positive controlling analog voltage; causing said second bridge to open in the presence of a negative controlling analog voltage; shifting the bridges to a reciprocally oscillating mode of operation as the current approaches zero-current state; and feeding output D.C. voltages of said bridges to said motor means connected to said bridges as a load.

3. An apparatus for switching thyristor bridges in converting alternating current statically to direct current comprising: two thyristor bridges in parallel receiving a source of A.C. current, said bridges being connected to a current measuring device; said current measuring device being connected to a controller for selecting either of said thyristor bridges for firing output pulses of said controller to be fed to an igniter unit; said controller being defined by a summing amplifier, whereby an output signal thereof controls the igniter unit and a current datum switch, a voltage limiter switch and voltage limiters connected theretoo; said igniter unit having outputs fed back to said thyristor bridges, igniting control gates in proper sequence; and direct current motor means in circuit relation with the output of said thyristors, whereby the output current of said thyristor bridges is employed to drive said motor means.

* * * * *